(12) United States Patent
Gudnason et al.

(10) Patent No.: US 11,788,667 B2
(45) Date of Patent: Oct. 17, 2023

(54) PIPE CONNECTOR

(71) Applicant: SET EHF., Selfoss (IS)

(72) Inventors: Robert Karel Gudnason, Selfoss (IS); Orn Einarsson, Selfoss (IS)

(73) Assignee: SET EHF, Selfoss (IS)

( * ) Notice: Subject to any disclaimer, the term of this patent is extended or adjusted under 35 U.S.C. 154(b) by 64 days.

(21) Appl. No.: 17/434,903

(22) PCT Filed: Feb. 27, 2020

(86) PCT No.: PCT/IS2020/050006
§ 371 (c)(1),
(2) Date: Aug. 30, 2021

(87) PCT Pub. No.: WO2020/174502
PCT Pub. Date: Sep. 3, 2020

(65) Prior Publication Data
US 2022/0170583 A1    Jun. 2, 2022

(30) Foreign Application Priority Data
Feb. 28, 2019   (IS) .......................................... 050255

(51) Int. Cl.
*F16L 59/16*     (2006.01)
*F16L 25/00*     (2006.01)

(52) U.S. Cl.
CPC ......... *F16L 59/161* (2013.01); *F16L 25/0036* (2013.01)

(58) Field of Classification Search
CPC ... F16L 25/0036; F16L 59/161; F16L 59/024; F16L 59/103; F16L 59/163
See application file for complete search history.

(56) References Cited

U.S. PATENT DOCUMENTS

| | | | |
|---|---|---|---|
| 266,483 A * | 10/1882 | Kruesi | F16L 23/036 285/133.11 |
| 707,303 A * | 8/1902 | Cleland et al. | F16B 21/082 285/119 |

(Continued)

FOREIGN PATENT DOCUMENTS

| | | | | |
|---|---|---|---|---|
| CH | 428353 A | * | 1/1967 | |
| DE | 19633015 A1 | * | 2/1998 | F16L 41/06 |

(Continued)

OTHER PUBLICATIONS

International Search Report and Written Opinion dated Jun. 8, 2020 for corresponding International Application No. PCT/IS2020/050006.

(Continued)

*Primary Examiner* — Zachary T Dragicevich
*Assistant Examiner* — James A Linford
(74) *Attorney, Agent, or Firm* — TAROLLI, SUNDHEIM, COVELL & TUMMINO L.L.P.

(57) ABSTRACT

A three-way pipe connector set for connecting pipes such as corrugated insulated pipes used for transporting hot water such as in central heating systems. The connector set can accommodate pipes of different diameter, and comprises a mating pair of a lid piece and bottom piece, each having three semi-circular edge portions that mate with the respective corresponding portions in the mating piece to form circular holes, the circular holes having adjacent edge grooves forming circular grooves when the pieces mate. The set includes at least two top hat pieces, each comprising a cylinder portion and a flange portion, the flange portion having an edge groove to fit an O-ring and configured to fit in a circular groove of the connector. Pipe gaskets are provided for each top hat piece that fit around a suitable pipe to form a tight seal between the pipe and connector.

15 Claims, 2 Drawing Sheets

(56) References Cited

U.S. PATENT DOCUMENTS

| | | | | |
|---|---|---|---|---|
| 3,078,108 | A | * | 2/1963 | Smith ............... F16L 55/172 |
| | | | | 285/379 |
| 3,689,114 | A | * | 9/1972 | Meserole ........... F16L 13/103 |
| | | | | 285/21.2 |
| 3,871,400 | A | * | 3/1975 | Thastrup ........... F16K 27/006 |
| | | | | 137/363 |
| 3,944,260 | A | * | 3/1976 | Petroczky ........... F16L 55/179 |
| | | | | 285/179 |
| 4,465,307 | A | * | 8/1984 | de Lange ........... F16L 59/163 |
| | | | | 285/133.11 |
| 5,022,685 | A | * | 6/1991 | Stiskin .............. B29C 65/58 |
| | | | | 285/914 |
| 5,348,044 | A | | 9/1994 | Michel |
| 2004/0187543 | A1 | * | 9/2004 | Frigo ............... F16L 25/0036 |
| | | | | 72/316 |

FOREIGN PATENT DOCUMENTS

| | | | | |
|---|---|---|---|---|
| DE | 202013003695 | U | | 5/2013 |
| EP | 2990711 | A1 | | 3/2016 |
| FR | 2688860 | A1 | | 9/1993 |
| GB | 2041482 | A | * | 9/1980 ............ F16L 59/12 |
| JP | 02008587 | A | * | 1/1990 |
| WO | 2007004870 | A1 | | 1/2007 |

OTHER PUBLICATIONS

Iceland Search Report dated May 10, 2019 for corresponding Danish Application No. EU050255.

* cited by examiner

PIPE CONNECTOR

RELATED APPLICATIONS

The present application is a U.S. National Stage application under 35 USC 371 of PCT Application Serial No. PCT/IS2020/050006, filed on 27 Feb. 2020; which claims priority from IS Patent Application No. 050255, filed 28 Feb. 2019, the entirety of both of which are incorporated herein by reference.

FIELD OF INVENTION

The invention is within the field of pipes and pipe connections such as in particular insulated pipes and pipe connections suitable for warm water transfer in central heating systems.

BACKGROUND

Central heating systems such as geothermal heating systems require extensive insulated plumbing systems for transporting hot water some distances with minimum heat loss. New and more flexible pipes, such as corrugated pipes of type Elipex™ (Set hf. Iceland) and similar, provide more flexible materials, making the handling and laying of pipes and pipe systems less strenuous. Connecting pipes, such as with T-joints of present conventional type, is still demanding and cumbersome. WO 2007/004870 discloses a housing to be placed around a coupling between pipes that have been provided with an insulating sheath, the housing is configured to fit adapter pieces in longitudinal openings for receiving pipe ends with insulating sheaths.

Connectors that are easier to install and connect than those available today, give a tight seal and can accommodate pipes of different diameter would be appreciated in the field.

SUMMARY

The invention provides a three-way pipe connector set with a connector for connecting insulated pipes, which connector can accommodate pipes of different outer width. The connector is generally but not exclusively configured as a T-shape three-way connector, but can also take other forms, such as but not limited to a Y-shape connector. The connector set comprises a mating pair of a lid piece and bottom piece. The lid piece and bottom piece each have three semi-circular edge portions that mate with the respective corresponding semi-circular edge portions in the mating piece to form circular holes when the pieces mate, the semi-circular edge portions having adjacent edge grooves forming circular grooves when the pieces mate, on the inside of the sandwich formed from the lid and bottom pieces, adjacent to the edges of the respective circular holes.

The connector set further comprises top hat pieces, generally at least two but typically at least three. The top hat pieces are so named as they resemble a top hat, each top hat piece comprises a cylinder joined to a flange which is sized and configured to snugly fit in the above-mentioned circular groove of a circular hole of the connector. The flange comprises a peripheral edge groove to fit an O-ring or the like insulation. The cylinder on each respective top hat piece is sized to fit around an insulated pipe of a given size. Thus, by having different top hat pieces that have cylinders of different width, pipes of different width can be connected to the connector.

The connector set further comprises at least one pipe gasket for each top hat piece, which pipe gasket fits around an insulated pipe of a given desired size, to form a tight seal between the pipe and the inside of the cylinder of the respective top hat piece.

The connector set further comprises fastening means to securely fasten together the lid piece and bottom piece.

It follows from the above that the connector can be provided as a connector set, comprising the mentioned lid piece and bottom piece and a set of several top hat pieces, or desired top hat pieces can be selected and ordered to accompany a connector, based on user's wishes.

DESCRIPTION

Figure 1:
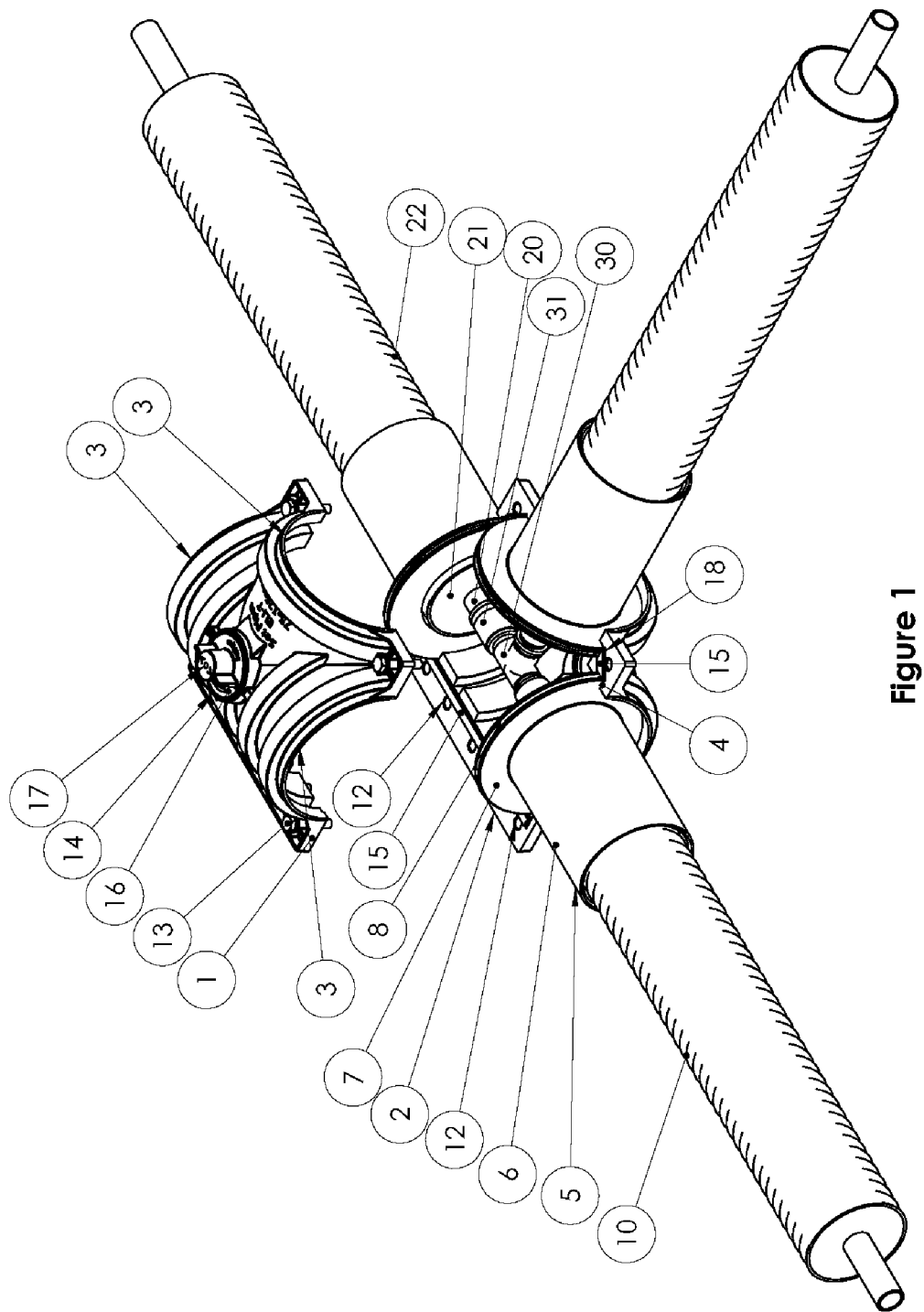
FIG. 1 shows a panoramic view of the connector with three pipes connected with conventional fittings and laid in a bottom piece of the connector with the lid piece not mounted.

In one embodiment the set of top hat pieces comprises at least two top hat pieces with respective cylinders of different diameter, that fit different sizes of insulated pipes (pipes having different outer width). In useful embodiments the connectors can be ordered (and assembled) with different top hat pieces. Thus, a given size of connector having circular holes of inner diameter e.g. 20 cm could thus accommodate top hat pieces that all have a flange that fit in the circular groove inside of the 20 cm circular hole but that can have different sized cylinders, e.g. for accommodating pipes of outer width in the range from 10 to 18 cm. Top hat pieces for connecting even smaller pipes to such connector could readily be arranged in accordance with the invention, but such smaller pipes could also be advantageously be connected with a smaller sized connector of the invention. Thus, in one embodiment of the invention, connectors are provided in different sizes, for example two or three sizes. In one embodiment, three sizes of connectors are provided, "small" for connecting pipes of outer width in the range 75-125 mm, "medium" for connecting pipes of outer width 140-180 mm, and "large", for connecting pipes of outer width in the range 200-250 mm. These ranges are mentioned as non-limiting examples, the size of the connectors can be different to accommodate different ranges of pipes.

In some embodiments the lid piece comprises a feed hole that is suitable for insertion of insulation material such as expanding foam insulation, and a cap that fits to close said feed hole. Preferably the cap comprises a valve for release of gas such as from expanding foam insulation, the valve being closable so that the cap provides a tight closure of the feed hole when the valve is closed. The valve can in some embodiments comprise a bore that can be closed tight with a snugly fitting rubber stopper or the like. In other embodiments the lid and bottom piece are without a feed hole, this is suitable when other insulation is to be used, such as insulation that is laid or inserted into the connector before the lid and bottom pieces are mated and fastened together. A suitable cap for a feed hole can be threaded, to fit a corresponding thread in the feed hole, in another embodiment the cap comprises a notch that fits an interlocking groove in the feed hole or adjacent to said hole.

At least one of said lid and bottom pieces should preferably comprise insulating seals such as rubber lists or the like, these should preferably extend between the semi-circular edge portions, such that when the lid and bottom pieces are mated together, they form a tight seal in between the circular holes. A tight seal is also preferably formed between the circular holes (more specifically the O-rings or insulating gaskets in the circular grooves adjacent the circular holes) and the flanges of the pipe hat pieces. Thirdly, a tight seal is as well formed between the cylinder interior and inserted pipes by way of the pipe gaskets. Thus, the entire connector of the invention when assembled provides a watertight enclosure around the connected pipes inside the connector. This is a critical feature as the connector is typically to be placed underground and should therefore preferably provide a watertight enclosure when submerged in water or water-saturated soil. The mentioned insulating seals are in some embodiments provided as lists (e.g. rubber lists) seated in and protruding from grooves on the lid or bottom piece, the other piece preferably having corresponding grooves for receiving the protruding portions of the lists.

The fastening means for securely fastening together the lid and bottom piece can be any of a number of suitable varieties. In some non-limiting embodiments the lid and bottom pieces are configured with concentric holes and fitting bolts and nuts used to rigidly keep the pieces together and preferably included in the connector set. In other embodiments clamps are used that are mounted on one piece (of the lid and bottom pieces) and clamped on to the edge of the other piece.

Figure 2:
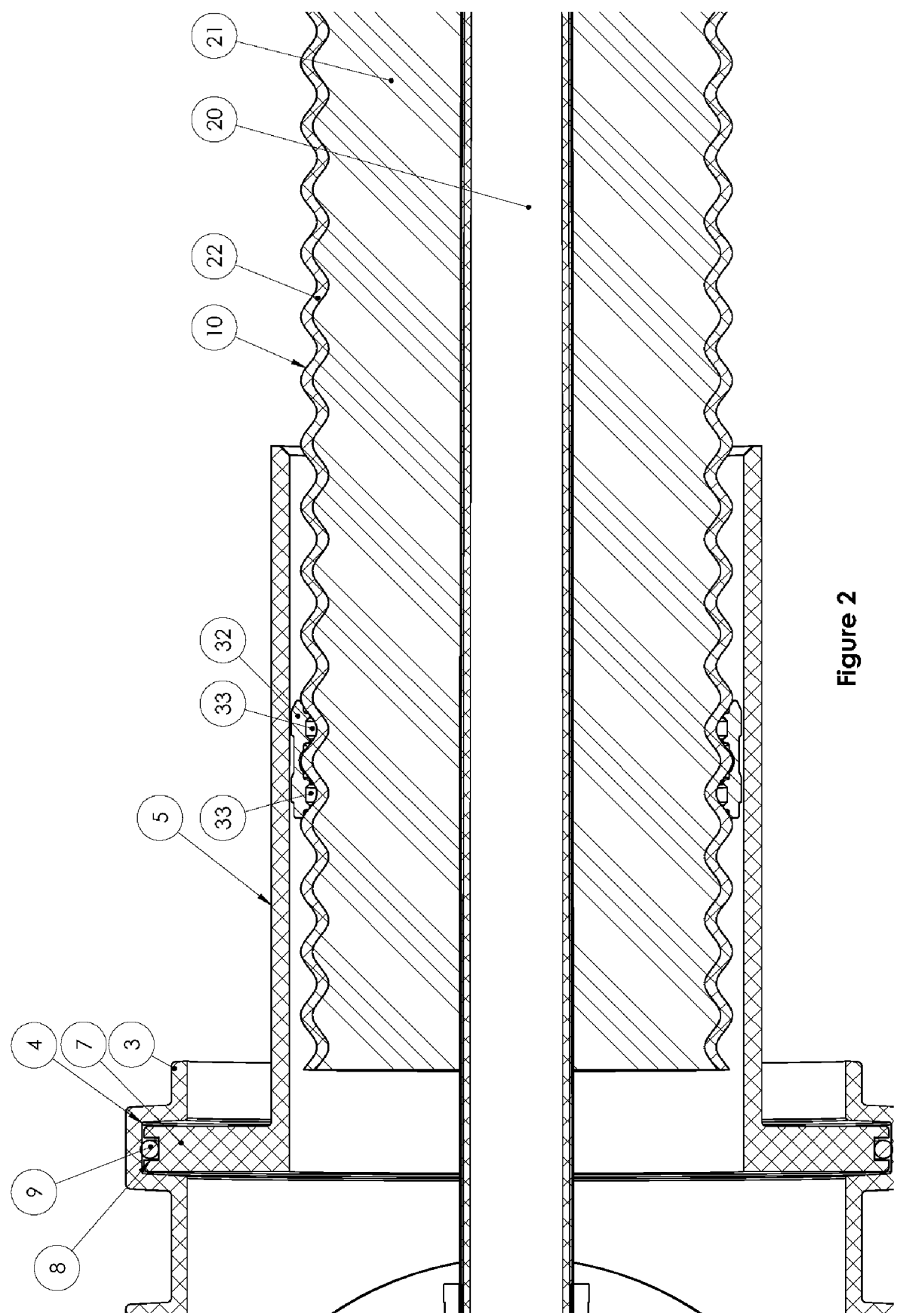
FIG. 2 shows a lengthwise cross-section through a pipe connected to the connector, showing specifically a gasket (32) forming a tight seal between the cylinder portion (6) and the pipe (10).

As mentioned, the connector of the invention is suitable for connecting corrugated pipes such as Elipex™ pipes offered by the applicant (Set hf., Iceland). In order to connect corrugated pipes, pipe gaskets are provided configured to fit onto such pipes and to provide a tight fit with the interior of the cylinder of a top hat piece of suitable size for the specific pipe. In one embodiment the pipe gasket of the pipe connector set comprises an inner edge shaped to fit in at least one circular groove of a corrugated pipe to be connected. The pipe gasket preferably also comprises at least one outer lip shaped to form a seal with the inside of the cylinder of the top hat piece. In some embodiments the pipe gasket comprises corrugated shape with one or more corrugations running along the inner perimeter of the gasket, which one or more corrugation are preferably shaped to match the corrugations of the corrugated pipe to be connected. Examples of a pipe gasket of the invention are shown in FIG. 2.

The lid piece and bottom piece can suitably be prepared from a polymer such as but not limited to polyethylene, polypropylene, polycarbonate, polyurethane, polyvinyl chloride acrylonitrile styrene acrylate, and acrylonitrile butadiene styrene.

In some embodiments the connector set is further provided with a dead-end lid that can be placed in and fits snugly in any one of the circular holes (instead of a top hat piece) for closing off said hole, to effectively form a two-way connector.

When connecting pipes with the connector set pipe ends are typically arranged and laid in a bottom piece with a pipe gasket placed on each pipe end, and each is inserted through a top hat piece. The top hat pieces are placed in the edge grooves of the semi-circular edge portions of the bottom piece and the ends of the inner pipes of the insulated pipes are connected with suitable conventional fittings (an exemplary embodiment is shown in FIG. 1, see fitting 30). Then the lid piece is placed on the bottom piece and fastened. In the case where a feed hole is on the lid piece for inserting expanding foam insulation, the insulation material can now be injected through the hole and a cap placed on the feed hole after insertion of the foam, preferably the cap has a valve to allow gas released from expanding foam insulation to escape. After the insulation has reached equilibrium the valve is closed so that the cap provides a tight closure. In the cases where other type of insulation is used, insulation can be placed in the bottom piece to enclose the connected pipe ends before the lid piece is placed on and fastened to the bottom piece.

FIG. 1 shows a panoramic overview of an embodiment of the invention. Three corrugated insulated pipes (10) have been arranged in the connector bottom piece (2), the lid piece (1) is shown not mounted in a position above the bottom piece. The bottom and lid pieces each have three semi-circular edge portions (3) with adjacent edge grooves (4). Top hat pieces (5) are mounted on the insulated pipes (10), the top hat pieces having cylinder portions (6) and flange portions (7). The flange portions have an edge groove (8) in which are placed O-rings (9) and the mounted O-rings fit snugly in the circular grooves formed by the edge grooves (4). Inside the cylinder pieces are pipe gaskets (32) (not shown; see FIG. 2) that fit in one or more groove of the corrugated insulated pipes (10) and form a tight connection between the pipe (10) and top hat piece (5). The bottom and lid piece have concentric holes (12) into which bolts (13) fit, to fasten together the pieces. A feed hole (14) is located on the top of the lid piece (1) and a cap (16) is shown inserted in the feed hole, the cap having a valve (17) for releasing gas when expanding foam insulation has been injected through the feed hole. The valve can be closed tightly with a rubber plug. Rubber lists (15) are mounted in fitting grooves (18) in the bottom piece in between the semi-circular grooves, to form a tight seal between the circular holes when the bottom and lid pieces have been fastened together. The corrugated insulate pipes comprise an inner pipe (20) the end of which extend from an insulation layer (21) which fills out the interior of the outer casing (22) The ends on the inner pipes (20) are connected together with a conventional three-way fitting (30,31).

FIG. 2 shows a lengthwise cross-section through a pipe connected to the connector, showing specifically a gasket (32) forming a tight seal between the inner surface of the cylinder of the top hat piece (5) and corrugations of the pipe (10). The gasket has a profile defining two protruding ridges (33) that lie in two adjacent corrugations of the pipe.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A three-way pipe connector set configured to connect insulated pipes having, different outer widths, the connector set comprising:
    a mating pair comprising a lid piece and a bottom piece, the lid piece and the bottom piece each having three semi-circular edge portions, each of the three semi-circular edge portions of the lid piece configured to mate with corresponding ones of the three semi-circular edge portions of the bottom piece to form circular holes, said semi-circular edge portions having adjacent edge grooves forming circular grooves when the lid piece and the bottom piece mate;
    at least two top hat pieces, each comprising a cylinder portion and a flange portion on one end of the cylinder portion, the flange portion having an edge groove configured to fit an insulating gasket, the flange portion configured to fit in any of said circular grooves, the cylinder portion being sized to fit around an insulated pipe of desired size;
    at least one pipe gasket for each of the least two top hat pieces configured to fit around said insulated pipe of desired size to form a tight seal between the insulated pipe and the inside of the cylinder portion of the respective one of the at least two top hat pieces; and
    fastening means configured to securely fasten together the lid piece and bottom piece.

2. The three-way pipe connector set according to claim 1, wherein said at least two top hat pieces comprise at least top hat pieces with respective cylinder portions of different diameter that fit different sizes of insulated pipes, the at least two top hat pieces having the same diameter flange portions.

3. The three-way pipe connector set according to claim 1, wherein said lid piece comprises:
    a feed hole configured to receive insulation material; and
    a cap that fits to close said feed hole.

4. The three-way pipe connector set according to claim 3, wherein said cap comprises a valve that provides for release of gases, said cap providing a tight closure of the feed hole when the valve is in a closed position.

5. The three-way pipe connector set according to claim 3, wherein said cap is threaded and fits a mating thread in said feed hole.

6. The three-way pipe connector set according to claim 3, wherein said cap comprises a notch that fits an interlocking groove in the feed hole or adjacent to said feeding hole.

7. The three-way pipe connector set according to claim 3, wherein the feed hole is configured to receive an expanding foam insulation.

8. The three-way pipe connector set according to claim 1, wherein at least one of said lid piece and bottom piece comprises an insulating seal extending between said semi-circular edge portions.

9. The three-way pipe connector set according to claim 8, wherein at least one of said lid piece and bottom piece comprises a groove and said insulating seal comprises a rubber strip sized to be seated in said groove and comprising a protruding portion.

10. The three-way pipe connector set according to claim 9, further comprising a corresponding groove defined by the at least one of said lid piece and bottom piece configured to receive the protruding portion of the rubber strip.

11. The three-way pipe connector set according to claim 1, wherein said fastener comprises:
    concentric holes in mating edges of said lid piece and bottom piece; and
    bolts that fit in said holes for mating said lid piece and said bottom piece tightly.

12. The three-way pipe connector set according to claim 1, wherein said at least one pipe gasket is configured to fit on a corrugated pipe, the at least one pipe gasket comprising:
    an inner edge shaped to fit in at least one circular groove of said corrugated pipe; and
    at least one outer lip shaped to form a seal with the inside of the cylinder portion of at least one of said at least two top hat pieces.

13. The three-way pipe connector set according to claim 1, wherein the lid piece and bottom piece comprise a polymer comprising polyethylene, polypropylene, polycarbonate, polyurethane, polyvinyl chloride acrylonitrile styrene acrylate, acrylonitrile butadiene styrene, or combinations thereof.

14. The three-way pipe connector set according to claim 1, further comprising a dead-end lid configured to be placed in any one of the circular holes for closing off said circular hole to form a two-way connector.

15. The three-way pipe connector set according to claim 1, wherein the insulating gasket is an O-ring.

* * * * *